(12) United States Patent
Jung (10) Patent No.: US 7,156,443 B1
(45) Date of Patent: Jan. 2, 2007

(54) GOLF CART SEAT ACTIVATED SAFETY BAR DEVICE

(76) Inventor: Man Young Jung, 2750 E. Washington Blvd. Ste 150, Pasadena, CA (US) 91107

( * ) Notice: Subject to any disclaimer, the term of this patent is extended or adjusted under 35 U.S.C. 154(b) by 0 days.

(21) Appl. No.: 11/317,583

(22) Filed: Dec. 23, 2005

(51) Int. Cl.
*B60N 2/02* (2006.01)

(52) U.S. Cl. ............... 296/68.1; 296/1.04; 280/DIG. 5; 280/748; 297/464

(58) Field of Classification Search ........... 296/190.03, 296/68.1, 65.02, 65.05, 1.04; 280/DIG. 5, 280/748, 749, 802; 180/271; 297/469, 464
See application file for complete search history.

(56) References Cited

U.S. PATENT DOCUMENTS

| | | | | |
|---|---|---|---|---|
| 2,801,866 A | * | 8/1957 | Naslund | 280/748 |
| 3,393,010 A | * | 7/1968 | Steinberg | 297/487 |
| 4,509,798 A | * | 4/1985 | Strothers | 297/487 |
| 4,537,446 A | * | 8/1985 | Roney et al. | 297/464 |
| 5,499,844 A | * | 3/1996 | Dirck | 280/748 |
| 5,853,193 A | * | 12/1998 | Marshall | 280/748 |
| 6,530,448 B1 | * | 3/2003 | Abels et al. | 180/271 |
| 6,752,422 B1 | * | 6/2004 | Sauermann | 280/748 |
| 6,808,038 B1 | * | 10/2004 | Schneider | 180/271 |

* cited by examiner

*Primary Examiner*—Jason Morrow
(74) *Attorney, Agent, or Firm*—Clement Cheng (57) ABSTRACT

A golf cart safety bar device is activated by occupied cart seats operatively installed on the cart frame to swivel about hinges and on spring biases. The safety bar device includes a pair of laterally adjacent driver/passenger seat bottoms each having a front end and a rear end. A weight is installed internally or externally of the cart frame to hold up the seat front at rest until the seating passenger depresses it. The weight means provides an eccentric weight about its own axis of rotation. A safety bar is fixed at one end to the weight means with the opposite end protruding upright at rest in preparation for a passenger to board the cart without a blocking. When passengers sit the safety bars are lowered limiting lateral outward movement of passengers from the cabin. The safety bars block the entrances or exits.

20 Claims, 7 Drawing Sheets

GOLF CART SEAT ACTIVATED SAFETY BAR DEVICE

BACKGROUND OF THE INVENTION

A. Field of the Invention

The present invention relates to a safety device for vehicles, and more particularly to a safety barrier for passenger carts with an open cabin.

B. Description of the Prior Art

Along with a growing population of golf players, golf course accidents have become more frequent, especially golf cart accidents. Golf carts can lead to a variety of accidents like passenger falling out of moving golf carts, or cart collisions. Despite their boarding convenience, golf carts are commonly unenclosed and lack proper rider support through rough terrain or steep slope, which can be found in many golf courses today. Because the golf carts are made for club premises and not for street driving, they have been free of safety restraint requirements or protections that make them vulnerable to risks. If a cart path has such steepness, sharpness and narrowness that require a driver to take a sharp turn, chances of serious accidents become high resulting in incurable injuries and even fatalities of the riders. Also, more and more children are playing golf and riding as golf cart passengers on a golf course and the current safety equipment is not well suited for smaller passengers.

For the sake of riding comfort, there were suggestions to close the open sides of the golf carts. U.S. Pat. No. 6,293,610 to Howard represents a custom designed door system for golf cart-type street vehicle to modify an open golf cart to a street legal version with an enclosure top. However, a practically simple safety means is not yet available to retrofit in the current cabin design of golf carts. Also, no suggestions have yet been made to provide an automatic safety means for golf carts where the passenger's weight switches a side safety barrier.

Therefore, the object of the present invention is to provide a safety bar barrier for unenclosed vehicles including golf cart, which barrier is activated by a cart seat occupied by the passenger or driver. Another object of the present invention is to provide a safety bar barrier for golf cart having an optional privacy protection in addition to the novel transportation safety.

SUMMARY OF THE INVENTION

A safety bar device according to the present invention is used for vehicles with an open cabin having a frame unit mounted on motorized wheels. The device comprises (a) at least one swivel seat bottom mounted at its rear end on the frame unit through a number of hinges under a spring bias, (b) a gravity actuator installed to pivot about an axis on the frame unit and provide an eccentric weight for pushing up the seat at an angled posture with its front end raised until it is switched back to a leveled position by the weight of a seating passenger, and (c) an elongated bar generally L-shaped which is fixed at its proximal end to the gravity actuator with the opposite end protruding upright at rest in preparation for the passenger to board the vehicle without an interference until the passenger takes the seat which activates the elongated bar against the bias of the gravity actuator lowering the bar. This limits lateral passenger movement from the cabin of the vehicle to keep passengers in their seats.

The vehicle may be a golf cart that is impractical to have a conventional safety restraint for street vehicles.

The golf cart seat-activated safety bar device of the present invention includes a pair of laterally adjacent driver/passenger seat bottoms each having a front end and a rear end, which is pivotally connected through a number of hinges to a raised floor of the golf cart frame. Also, a number of leaf springs are disposed next to the hinges to assist in supporting the seat bottoms at a raised position at which the passenger takes a seat.

A weight rotor is a primary actuator to hold up the seat front at rest until the seating passenger occupies and depresses it. The rotor is made of a heavy solid material such as metal and has a deep V-shaped notch down to its center of rotation to provide an eccentric weight to a shaft to which the rotor is fixed under the frame floor.

The shaft is rotatably supported at its outer end by a metal bracket fixed externally of the cart frame and at its inner end by an interior bracket extending from a wall of the frame. An articulated push bar has a lower leg fixed to the rotor at its bottom end by one or more fasteners. The leg also has a top end connected to an upper arm via an articulated connection. The arm is fixed at its distal end to the bottom surface of the seat bottom by a hinge.

An elongated safety bar is generally L-shaped and connected at its proximal end to an auxiliary weight arm, which is in turn attached to the protruding end of the rotor shaft. The remainder of the safety bar protrudes upward at rest in preparation for a passenger to board the cart without a blocking.

The safety bar has a length that extends across the cabin at least partially and a certain height above the top surface of the seat bottom to support the torso of a passenger in a rough ride. The safety bar has a bore to grasp the shaft to ensure a non-rotating engagement between them. The bar is lightweight relative to the weight rotor and supportive of the moment of inertia of the torso of a boarding passenger in operation and it may be made of a variety of materials including wood, plastic or aluminum among others.

Thus, the safety bar is normally standing upright to clear a way for the passenger to enter the cart without interference.

When the passenger enters and the seat bottom is depressed, the push bar is lowered against the weight bias of the rotor and the spring bias. The safety bar is also lowered to a level to limit the lateral outward movements of the passenger from the cabin of the golf cart. The bar at the seat bottom now blocks the entire entrance or exit of that side of the cart to prevent involuntary fallout of the passenger from the seat bottom.

When a passenger is off the safety seat, the weight of the rotor and arm prevails to uphold the front end of the seat bottom, which is also supported by the expanding leap springs at the rear end of the same seat bottom. At the same time, this pivotal urge of the arm about its axis maintains the safety bar standing upright to clear a way for the passenger to enter the cart without interference until the passenger occupies the seat which then switches the safety bar down into the operational level.

DETAILED DESCRIPTION OF THE PREFERRED EMBODIMENT

Figure 1:
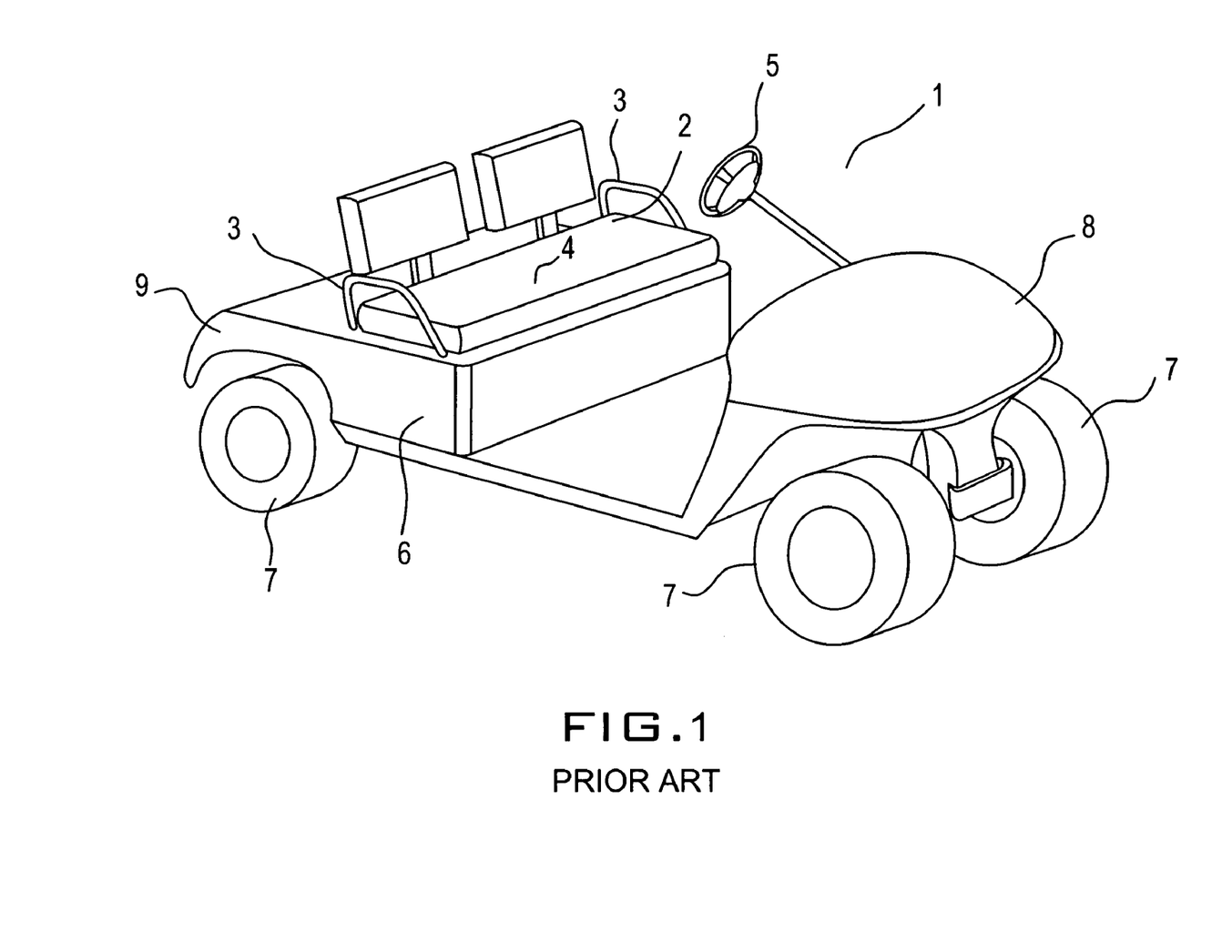
FIG. 1 is a perspective view of the golf cart according to prior art omitting its roof and support frame for simplicity.

Referring to FIG. 1, common golf cart 1 has a seat 2 and armrests 3 fixed at opposite sides of a seat bottom 4 of the seat 2, with the driver being located on the seat 2 near a steering wheel 5, which may be either left-sided or right-sided. The cart has a frame unit 6 as well as wheels 7 mounted thereon in the manner common to golf carts. The cart 1 is driven by a gasoline engine or electrical motor not shown in the drawing. Also common to the typical golf carts are transmission gearing, an ignition system that connects a power source, such as a battery, of the drive motor of the cart and a breaking system, all of which are trimmed by a front fender 8 and a rear fender 9. The golf cart 1 may also have a roof and support frame, which are not shown in the drawing.

Figure 2:
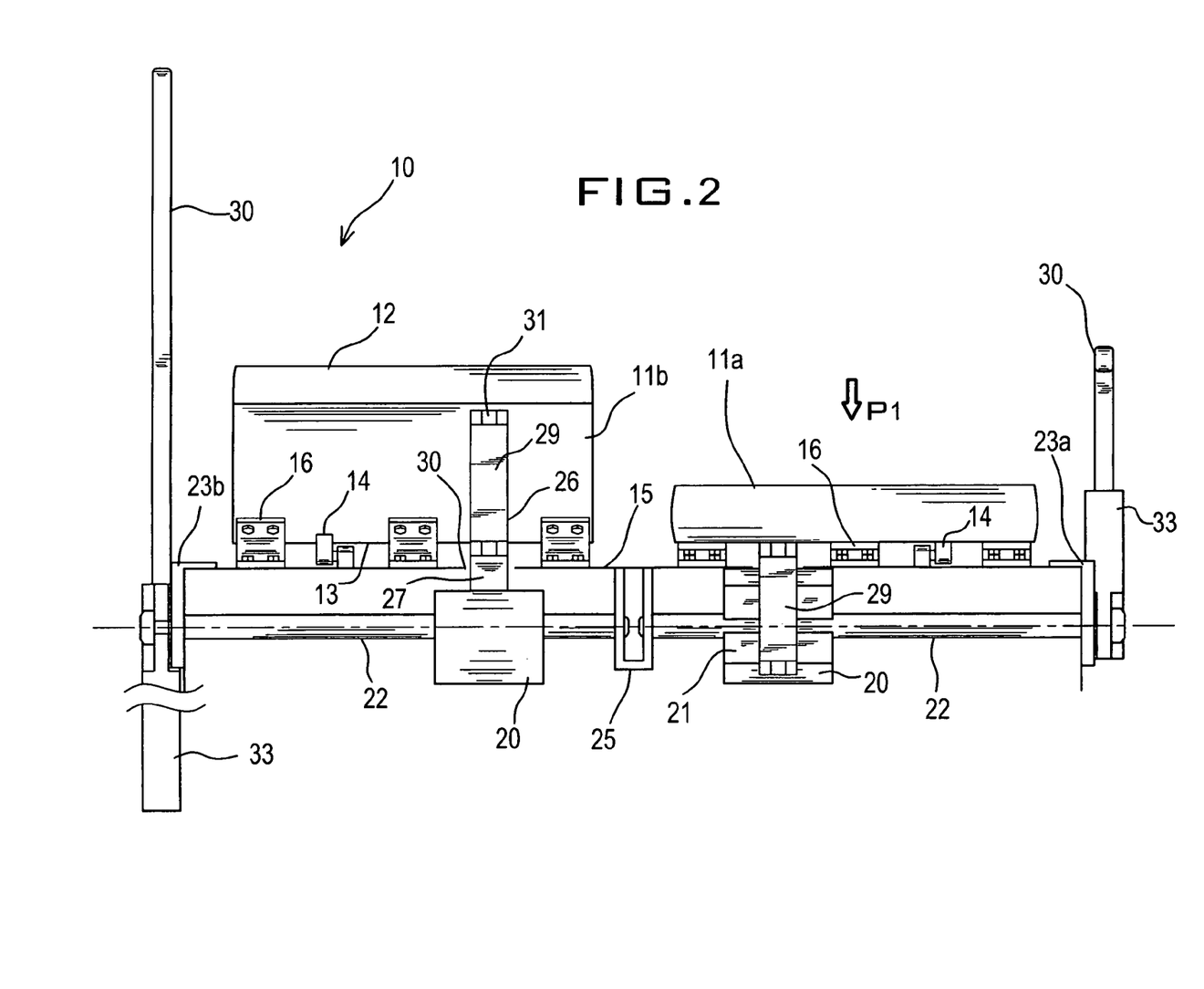
FIG. 2 is a front view of a pair of driver/passenger seats equipped with a safety bar device according to a first embodiment of the present invention showing one side bar at rest contrasted to another in operation.
Figure 3:
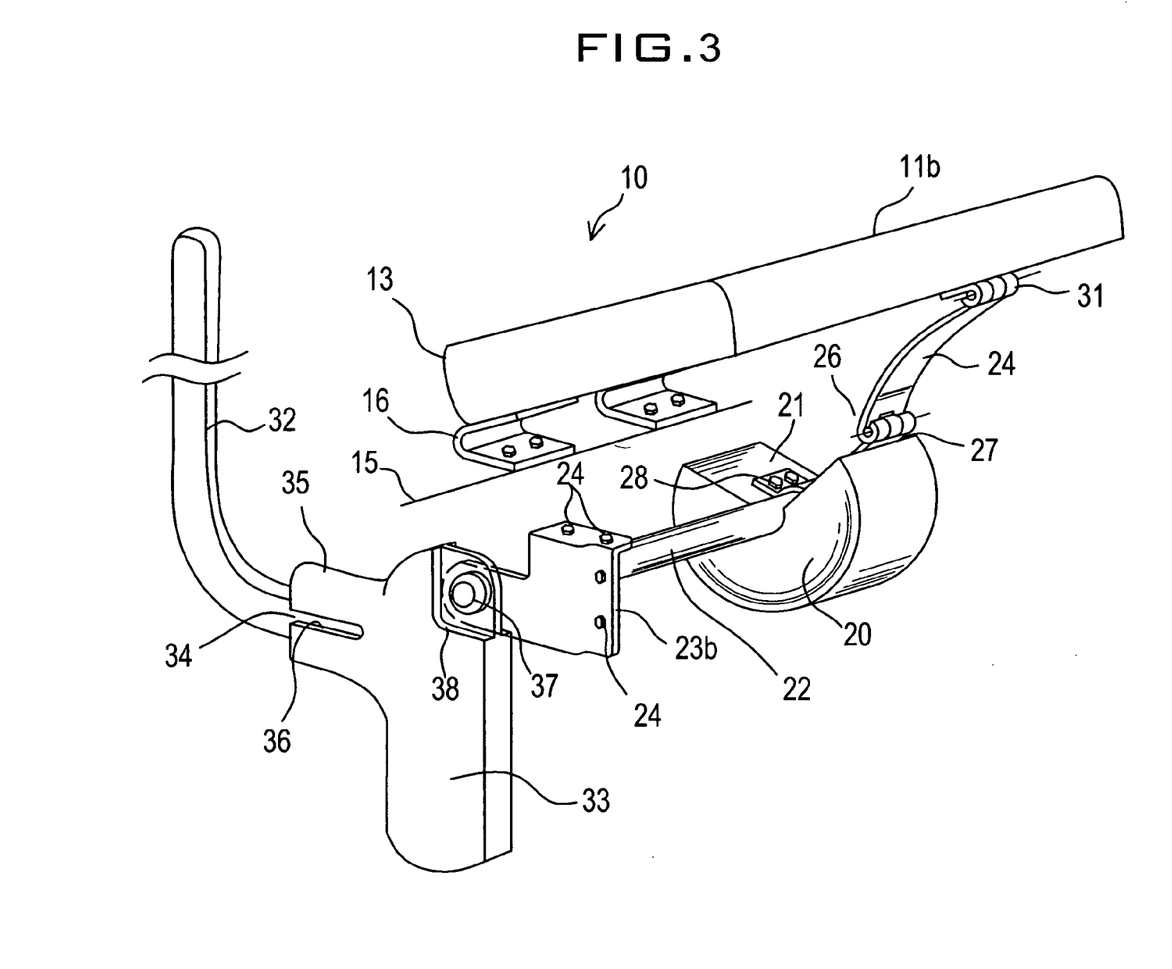
FIG. 3 is a partially broken away perspective view of the seat-activated safety bar device of FIG. 2 in its upright position about a pivotal shaft at rest.
Figure 4:
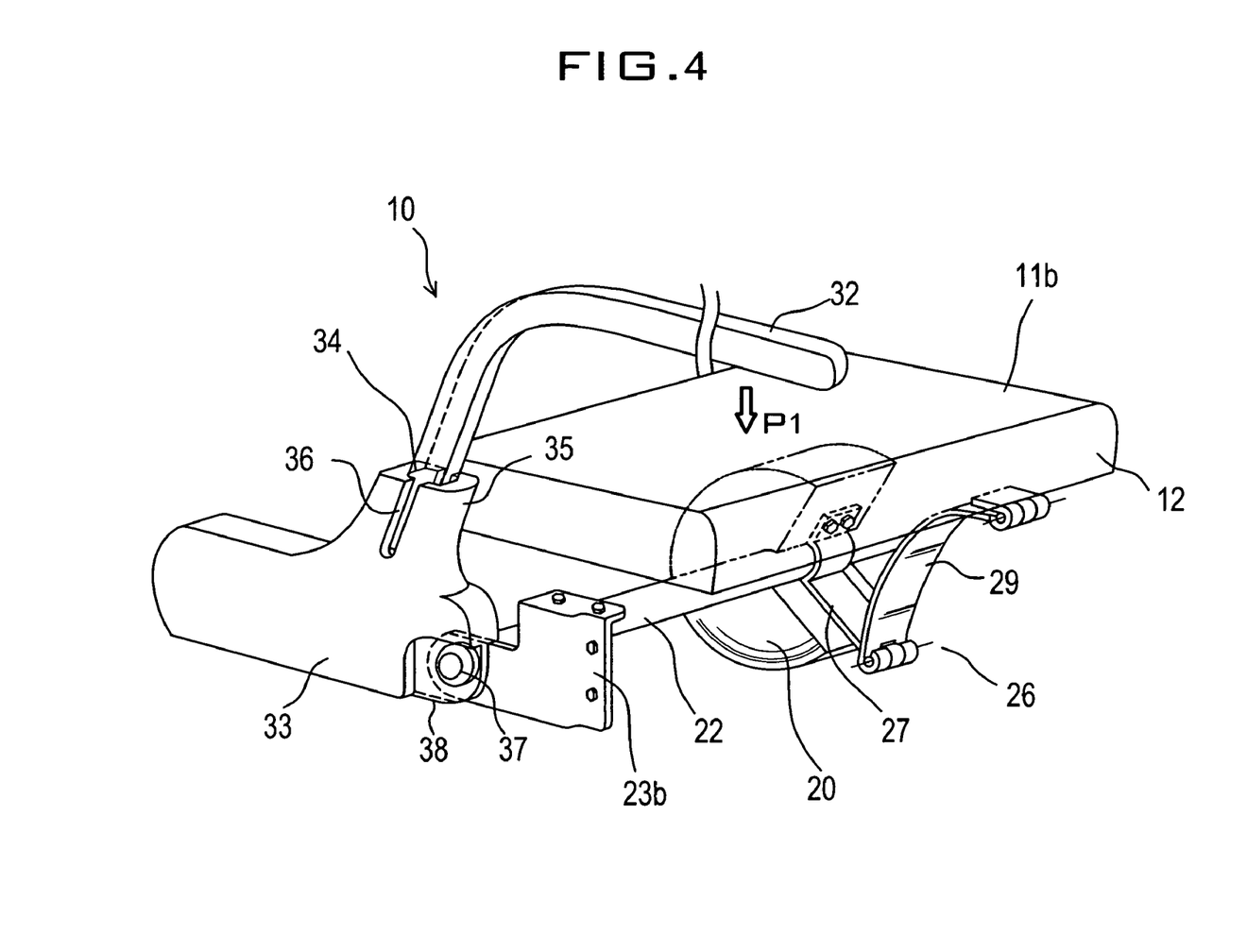
FIG. 4 is a perspective view of the seat-activated safety bar device of FIG. 3 in operation.

The first embodiment of the golf cart seat-activated safety bar device 10 of the present invention is illustrated in FIGS. 2 through 4. The safety bar device 10 includes a pair of laterally adjacent driver/passenger seat bottoms 11a and 11b each having a front end 12 and a rear end 13, which is pivotally connected thru a number of hinges 14 to a raised floor 15 of the golf cart.

In line with the hinges 14, a number of leaf springs 16 also connect the rear ends 13 of the seat bottoms 11a and 11b to the floor 15 in order to assist the supported floatation of the same seat bottoms.

In FIG. 3, a weight rotor 20 is employed as a primary actuator to hold up the seat front 12 of the seat bottom 11b at rest until the seating passenger depresses it. The rotor 20 may be made of a heavy solid material such as metal and has a deep V-shaped notch 21 down to its center to provide an eccentric weight to a shaft 22 to which the rotor 20 is fixed. The rotor 20 and the shaft 22 are installed under the frame floor 15. The rotor 20 may be also made of two or more components including a shell of the same profile and heavyweight filler such as concrete or other cementitious materials.

The rotor 20 may also comprise an elongated member that extends almost the entire length of the shaft in order to take up less diametrical space in the cart frame. Such elongated member gives an eccentric weight to the shaft 22.

Two such shafts 22 are rotatably supported at their outer ends by a pair of metal brackets 23a and 23b angled to fit on the respective end walls of the floor 15 where they are fixed by fasteners 24. An interior bracket 25 extending from a wall of the frame 15 supports the inner ends of the shafts 22.

An articulated push bar 26 has a lower leg 27 fixed to the rotor 20 at its bottom end by one or more fasteners 28. The leg 27 also has a top end connected to an upper arm 29 via an articulated connection. The push bar 26 extends through the frame floor 15 at an appropriate opening 30 shown in FIG. 2.

The arm 29 is fixed at its distal end to the bottom surface of the seat bottom 11b by a hinge 31.

As shown in more detail in FIGS. 3 and 4, an elongated safety bar 32 is generally L-shaped and connected at its proximal end to an auxiliary weight arm 33, which is in turn attached to the protruding end of the shaft 22. As shown, the safety bar 32 is press fitted at its proximal end into a top slot 34 formed in a neck portion 35 of the arm 33. A slit 36 formed at one or both sides of the neck portion 35 is to provide a resiliency of the arm 33 locally to allow the press fitting with the bar 32. To secure the safety bar 32 in the neck portion 35, a fastening screw may be threaded through the mating members.

The remainder of the safety bar 32 protrudes upward at rest in preparation for a passenger to board the cart. The safety bar has an upright position when the seat is in an upright propped position. The upright position is the neutral position. The safety bar lowers after a user sits in the seat. The lowered position is also called the engaged position, or seated position.

Because the bar 33 is attached off center of the axis of rotation 37 toward the center of gravity of the weight arm 33, it acts positively to bias the safety bar 32 upright. The safety bar 32 has a length that extends across the cabin at least partially and a certain height above the top surface of the seat bottom 11b to support the torso of a passenger in a rough ride.

In this embodiment, the weight arm 33 is optionally installed as an auxiliary actuator to assist in holding up the seat front 12 at rest until the seating passenger depresses it. The arm 33 may be made of a heavy solid material such as metal and extends away from its axis of rotation 37 to provide an eccentric weight to activate the push bar 26. The arm 33 may be also made of two or more components including a shell of the same profile and heavyweight filler such as concrete or other cementitious materials.

The weight arm 33 is rotatably supported at its bore formed transversely in a narrow heel 38 by the shaft 22 on the metal bracket 23b. The narrow heel 37 is centered between two opposite side walls of the weight arm 33 so that the arm has symmetrical lateral profiles for installation at either side of the golf cart with a mere change of the correct pair of the bracket 23a or 23b.

The bore of the weight arm 33 that grasps the shaft 22 may have a polygonal shape in cross section to ensure a non-rotating engagement between the arm 33 and the shaft 22. Otherwise, they may be fit with each other via a dovetail connection. Or the safety bar 32 may be attached directly to the shaft 22 through its bore formed at right angle to the axis of the shaft 22.

As long as the bar 32 is lightweight relative to the weight rotor 20 or the arm 33 and supportive of the moment of inertia of the torso of the boarding passenger in operation, it may be made of a variety of materials including wood, plastic or aluminum among others.

Therefore, when the safety bar device 10 is not activated the weight of the rotor 20 prevails to bias the push bar 26 upward raising the front end 12 of the seat bottom 11a or 11b, which is also supported by the expanding leap springs 16 at the rear end 13 of the same seat bottom. At the same time, the resulting radial position of the shaft 22 maintains the safety bar 32 standing upright to clear a way for the passenger to enter the cart without an interference that is shown by the seat bottom 11*b* at the left side of FIG. 2 and in FIG. 3.

In contrast, the seat bottom 11*a* at the right has been depressed by the passenger represented by a downward pressure P1, which depresses the push bar 26 against the weight bias of the rotor 20 and the spring bias 16 as well as the weight arm 33 if present. The safety bar 32 is lowered to a level, which limits the lateral outward movements of the passenger within the cabin of the golf cart which is shown at the right side of FIG. 2 or in FIG. 4. The bar 32 at the seat bottom 11*a* now blocks the entrance or exit of that side of the cart to prevent an involuntary fallout of the passenger from the seat bottom 11*a*.

Figure 5:
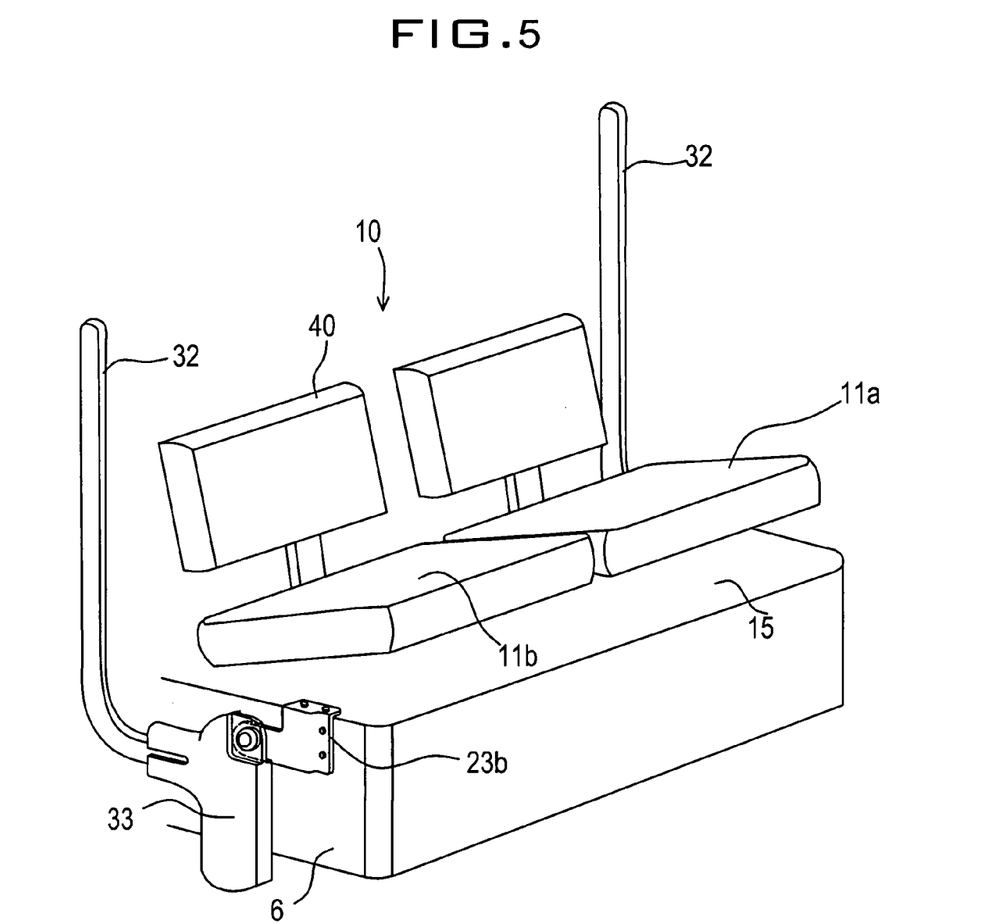
FIG. 5 is a perspective view of the empty driver/passenger seats equipped with the safety bar device of the present invention.
Figure 6:
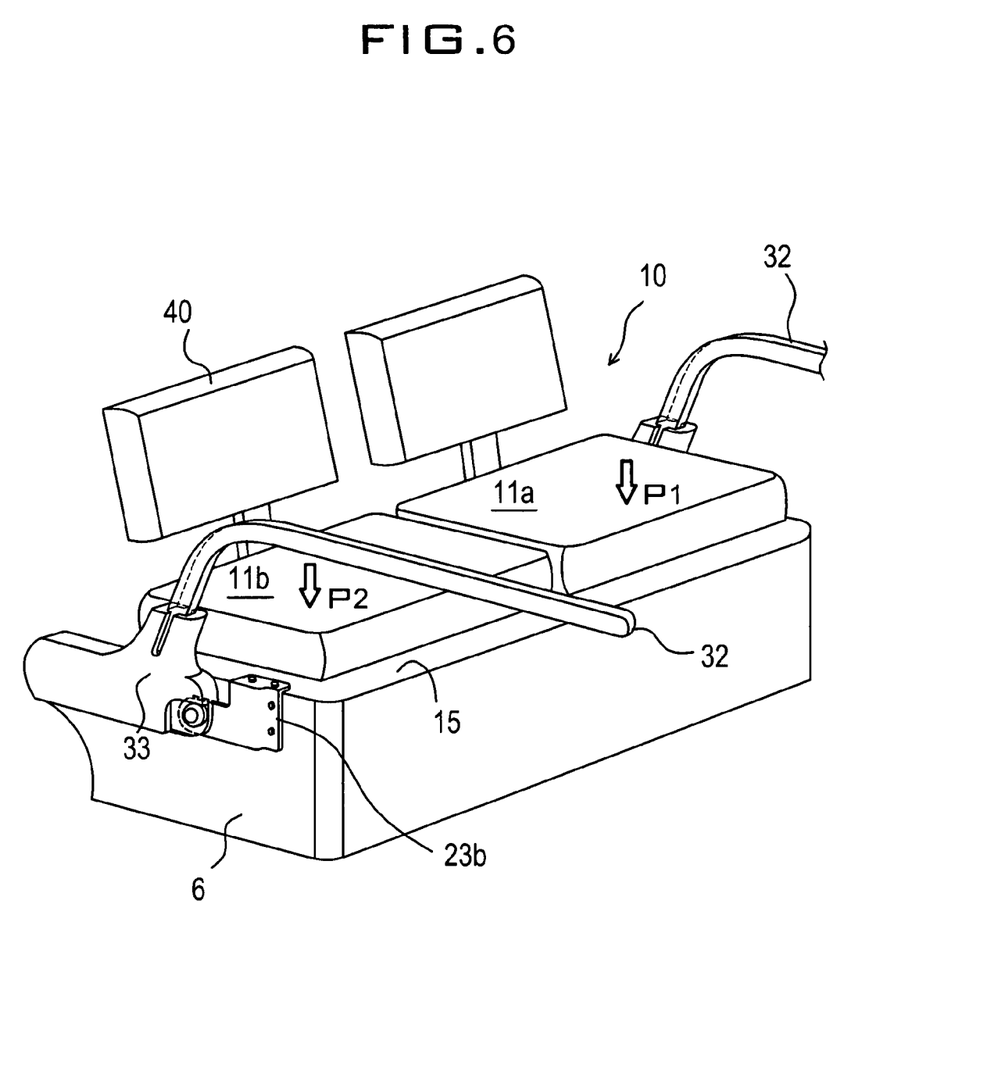
FIG. 6 is a perspective view of the occupied seats activating the safety bars under body weights of passengers not shown.

Turning now to FIGS. 5 and 6, the safety bar device 10 is zoomed out for a general viewing of the operation from the preliminary position of the device in FIG. 5 to the operational position of FIG. 6.

In FIG. 5, the seat bottoms 11*a* and 11*b* are complete with seat backs 40 with the seat bottoms suspended in equilibrium without the passengers.

However, when the passengers P1 and P2 take the seats as in FIG. 6, their weights prevail over the weight bias of the rotors 20 and the arms 33 and the spring bias discussed. Then, the safety bars 32 are lowered to a level, which limits the lateral outward movements of the passengers from the cabin of the golf cart. Although it is shown to install a pair of safety bar devices at opposite sides of the cart, the safety bar device at the driver side may be determined redundant due to the steering wheel as a support and thus left unguarded.

Figure 7:
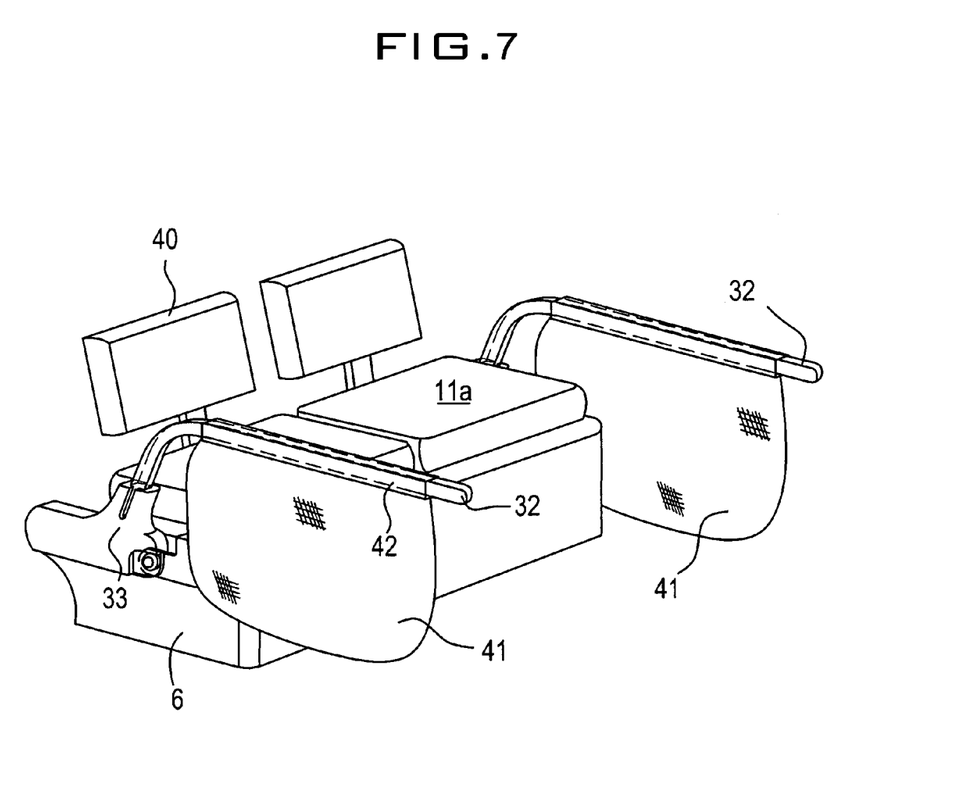
FIG. 7 is a perspective view of a seat activated safety bar device having optional side panels for privacy protection according to a second embodiment of the present invention.

FIG. 7 shows a second embodiment of the present invention wherein the safety bar 32 is adapted to function as a frame for a protective side skirt or panel 41. The side panel 41 is generally square and may be made of a light non-fabric or fabric material such as canvas to have a sleeve 42 along a side. The side panel 41 is tightly fitted over the length of the safety bar 32 at the sleeve 42 and such safety bar works as a privacy protection as well as a safety support for the passenger. When the bar 32 swivels back to the upright position, the panel 41 drapes down to reveal the access path to the seat.

As an alternate embodiment, an electrical motor can electrically control the safety bar, in conjunction with the mechanical means is mentioned above. An electrical motor shaft attached to the safety bar hinge can actuate the safety bar between a raised position and a lowered position. With the motor that can be actuated by a sensor switch, the electrical motor can lower the safety bar whenever a passenger is in seated position. The sensor switch may be a contact switch that cooperates with the movement of the seat. The electrical motor preferably has the same DC voltage as the vehicle DC voltage. It is preferred to include an electrical motor driven safety bar to allow smaller passengers such as children to be able to engage the safety mechanism. A manual electrical switch can be incorporated into the electrical motor assistance. The switch can raise and lower the safety bar allowing additional control, which would be helpful particularly for maintenance.

In lowered position, the safety bar optionally includes a locking mechanism to retain the safety bar in lowered position. The locking mechanism can be a clasp or clip that locks the safety bar into a safety bar slot. A slot can receive the free end of the safety bar and retain it in place until the user manually releases the locking mechanism to get out of the golf cart.

Therefore, while the presently preferred form of the golf cart seat activated safety bar device has been shown and described, and several modifications thereof discussed, persons skilled in this art will readily appreciate that various additional changes and modifications may be made without departing from the spirit of the invention, as defined and differentiated by the following claims.

CALL OUT LIST OF ELEMENTS

1: Golf Cart
2: Seat
3: Armrest
4: Seat Bottom
5: Steering Wheel
6: Frame Unit
7: Wheels
8: Front Fender
9: Rear Fender
10: Safety Bar Device
11*a*,11*b*: Seat Bottom
12: Front End
13: Rear End
14: Hinge
15: Frame Floor
16: Leaf Spring
20: Weight Rotor
21: V-notch
22: Shaft
23*a*,23*b*: Metal Brackets
24: Fasteners
25: Interior Bracket
26: Articulated Push Bar
27: Lower Leg
28: Fastener
29: Upper Arm
30: Opening
31: Hinge
32: Safety Bar
33: Auxiliary Weight Arm
34: Top Slot
35: Neck Portion
36: Slit
37: Axis of Rotation
38: Narrow Heel
40: Seat Back
41: Side Panel
42: Sleeve

The invention claimed is:

1. A safety bar device for vehicles with a cabin having a frame unit mounted on wheels comprising:
   a. a swivel seat bottom pivotally mounted on the frame unit by a pivot hinge;
   b. a gravity actuator connected to the swivel seat, wherein the gravity actuator is installed to pivot about an axis on the frame unit, wherein the gravity actuator has an eccentric weight propping the seat up at a gravity actuator neutral position until it is biased to a gravity actuator seated position by the weight of a seating passenger; and
   c. an safety bar fixed at a proximal end to the gravity actuator with a distal end protruding upright at the gravity actuator neutral position in preparation for the passenger to board the vehicle and lowered to a gravity actuator seated position when a passenger sits on the seat.

2. The safety bar device of claim 1, wherein the swivel seat bottom is under a spring bias at an angled posture with a front end raised at a gravity actuator neutral position; wherein the safety bar is generally L-shaped; wherein the safety bar acts against a gravity bias in a gravity actuator seated position to limit lateral outward movements of a passenger from a vehicle cabin.

3. The safety bar device of claim 1, wherein the gravity actuator comprises
   a. a weight rotor installed internally on the frame unit opposing the seat bottom and having a notch to provide the eccentric weight to a shaft to which it is fixed, the shaft being rotatably supported at its opposite ends latitudinal to the frame unit to allow the rotor to pivot; and
   b. an articulated push bar having a lower leg fixed to the rotor at its bottom end and an upper arm connected to a top end of the lower leg via a couple of articulated joints so that the push bar transmits the weight rotor bias or the passenger weight to the seat bottom.

4. The safety bar device of claim 3, wherein the weight rotor is made of a solid heavy material including metal.

5. The safety bar device of claim 3, wherein the weight rotor is made of a hollow structure filled with a weight.

6. The safety bar device of claim 3, wherein, the weight rotor extends substantially along the entire length of the shaft taking less diametrical space inside of the frame unit.

7. The safety bar device of claim 1, wherein the gravity actuator further comprises at least one safety weight arm installed externally and pivotally through a bracket to the frame unit adjacent to the seat bottom to maintain an upright posture by an eccentric weight about its axis of pivot, the bracket being shaped to fit a corner of either lateral side of the frame unit and fastened thereto allowing the arm to pivot.

8. The safety bar device of claim 7, wherein the weight arm is made of a solid heavy material including metal.

9. The safety bar device of claim 7, wherein the weight arm has a heel recessed at opposite sides so that the weight arm is symmetrical in lateral profile upon installation to either side of the vehicle with a mere change of the correct pair of the bracket.

10. The safety bar device of claim 1, wherein the safety bar further has a side panel attached to it in order to block the side opening of the vehicle to protect the privacy of the occupant at least partially while the safety bar is in operation.

11. A golf cart having a safety bar device comprising:
    a. a cabin having a frame unit mounted over wheels;
    b. a swivel seat bottom pivotally mounted on the frame unit by a pivot hinge;
    c. a gravity actuator connected to the swivel seat, wherein the gravity actuator is installed to pivot about an axis on the frame unit, wherein the gravity actuator has an eccentric weight propping the seat up at a gravity actuator neutral position until it is biased to a gravity actuator seated position by the weight of a seating passenger; and
    d. a safety bar fixed at a proximal end to the gravity actuator with a distal end protruding upright at the gravity actuator neutral position in preparation for the passenger to board the vehicle and lowered to a gravity actuator seated position when a passenger sits on the seat.

12. The golf cart of claim 11, wherein the swivel seat bottom is under a spring bias at an angled posture with a front end raised at a gravity actuator neutral position.

13. The golf cart of claim 11, wherein the safety bar is generally L-shaped.

14. The golf cart of claim 11, wherein the safety bar acts against a gravity bias in a gravity actuator seated position to limit lateral outward movements of a passenger from a vehicle cabin.

15. The golf cart of claim 11, wherein the safety bar further has a side panel attached to it in order to block the side opening of the vehicle to protect the privacy of the occupant at least partially while the safety bar is in operation.

16. A golf cart having a safety bar device comprising:
    a. a cabin having a frame unit mounted over wheels;
    b. a swivel seat bottom pivotally mounted on the frame unit by a pivot hinge;
    c. a gravity actuator connected to the swivel seat, wherein the gravity actuator is installed to pivot about an axis on the frame unit, wherein the gravity actuator has an eccentric weight propping the seat up at a gravity actuator neutral position until it is biased to a gravity actuator seated position by the weight of a seating passenger;
    d. a safety bar fixed at a proximal end to the gravity actuator with a distal end protruding upright at the gravity actuator neutral position in preparation for the passenger to board the vehicle and lowered to a gravity actuator seated position when a passenger sits on the seat; and
    e. an electrical motor assisting swivel motion of the safety bar, wherein the electrical motor can raise or lower the safety bar.

17. The golf cart of claim 16, wherein the swivel seat bottom is under a spring bias at an angled posture with a front end raised at a gravity actuator neutral position.

18. The golf cart of claim 16, wherein the safety bar is generally L-shaped;.

19. The golf cart of claim 16, wherein the safety bar acts against a gravity bias in a gravity actuator seated position to limit lateral outward movements of a passenger from a vehicle cabin.

20. The golf cart of claim 16, wherein the safety bar further has a side panel attached to it in order to block the side opening of the vehicle to protect the privacy of the occupant at least partially while the safety bar is in operation.

* * * * *